July 26, 1932. G. FLINTERMANN 1,869,137
FLEXIBLE JOINT
Filed Aug. 19, 1927 2 Sheets-Sheet 1
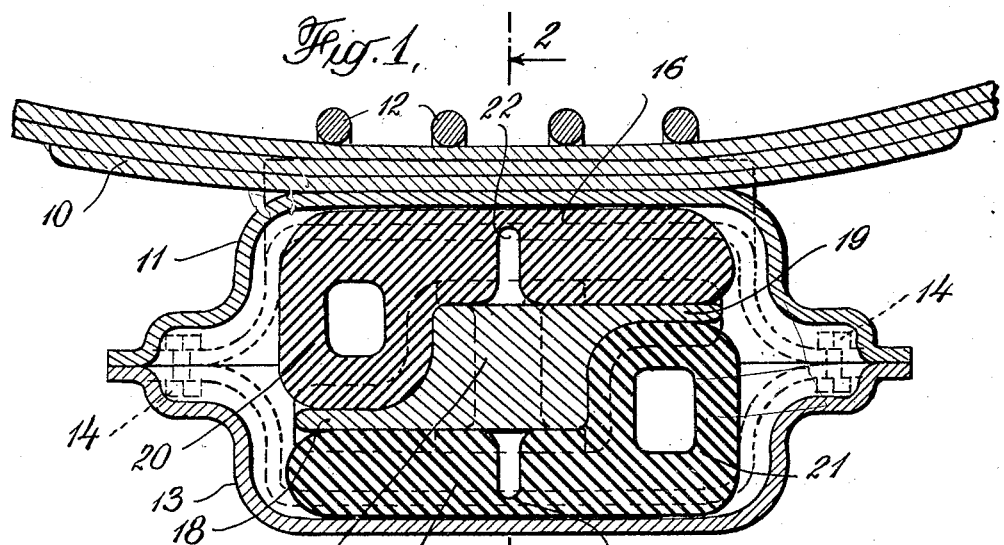
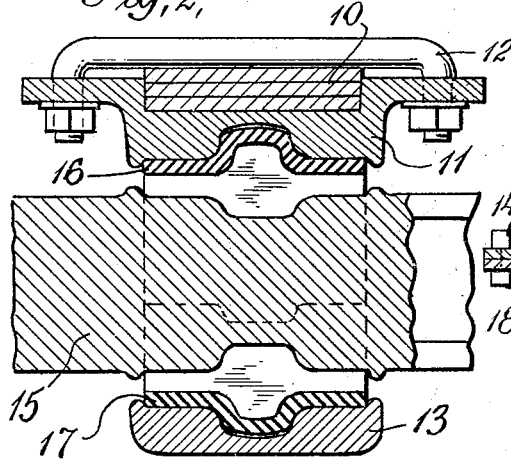
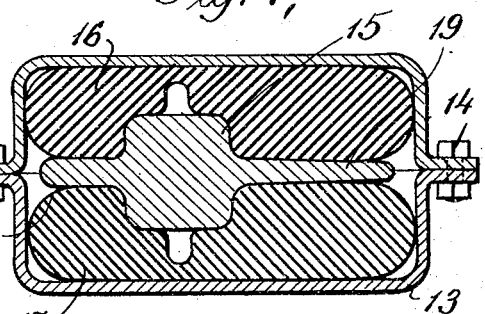
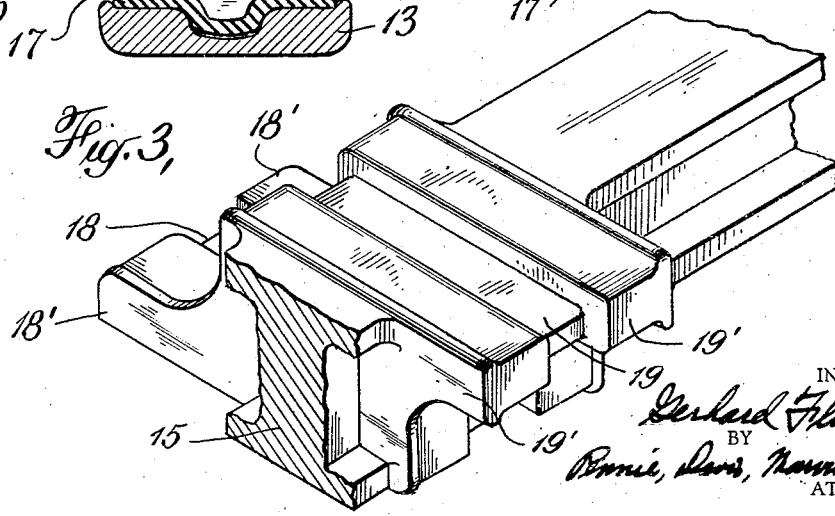
INVENTOR
Gerhard Flintermann
BY
ATTORNEYS

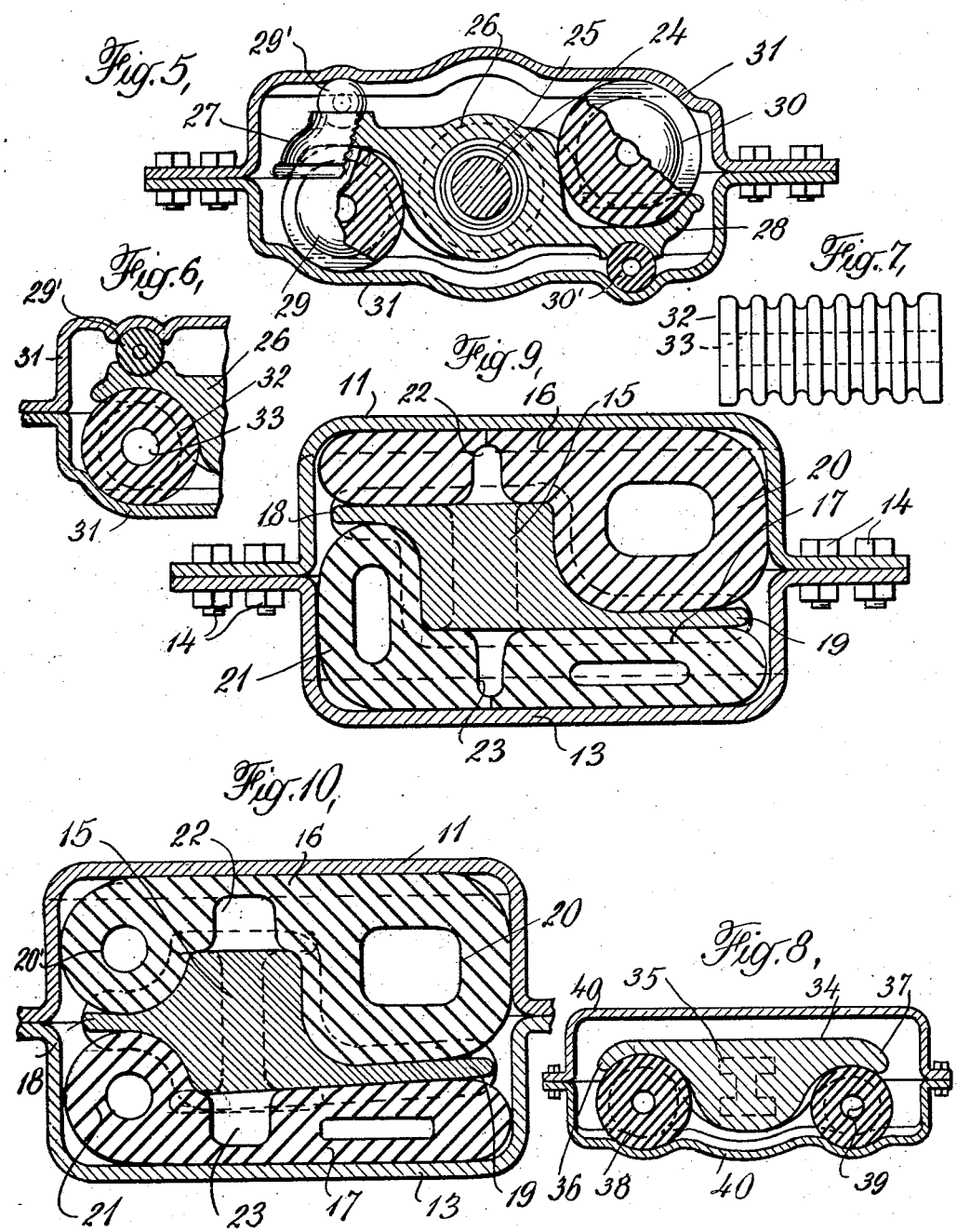

Patented July 26, 1932

1,869,137

UNITED STATES PATENT OFFICE

GERHARD FLINTERMANN, OF WEST ORANGE, NEW JERSEY

FLEXIBLE JOINT

Application filed August 19, 1927. Serial No. 214,128.

This invention relates to flexible joints of the type in which the movement between two relatively movable members is yieldingly resisted by an interposed body of flexible material.

One of the objects of the invention is to provide a flexible joint of this character which is inexpensive to manufacture as most of its parts may be made from drawn or pressed sheet metal.

Another object of the invention is to provide a flexible joint of the above-mentioned character having a peculiar configuration such that the compressing action of the flexible material between the two relatively movable members may be extended over a considerable area.

A further object is to provide a flexible joint of the kind mentioned in which the flexible material may be massed to a greater degree at those places, where the greatest amount of movement between the parts takes place and likewise may have less mass at those places where the movement between the parts is less.

It is also an object of the present invention to provide an improved form of flexible joint for resiliently supporting rotating, vibrating or constantly varying loads, such as the rotating or vibrating shaft of a piece of machinery, an entire machine or parts thereof, or bodies supported on a moving or vibrating member.

For a better understanding of the invention, reference is made to the accompanying drawings in which are illustrated a number of different forms of the improved flexible joint of this invention. In these drawings:—

Figure 1 illustrates one form of a flexible joint of this invention as applied to a vehicle axle and spring combination;

Fig. 2 is a cross section of the same taken along the line 2—2 of Figure 1;

Fig. 3 is a perspective view illustrating a preferred shape of axle for mounting the flexible joint structures shown in Figs. 1 and 2;

Fig. 4 illustrates a modified form of flexible joint in which the resilient elements are symmetrically shaped about the member which they support;

Fig. 5 is a flexible joint of this invention as applied to a journal which receives a substantially continuous but variable torque;

Fig. 6 illustrates a modified form of the joint of Fig. 5;

Fig. 7 shows a yieldable member which may be used in the apparatus of Fig. 6;

Fig. 8 shows a flexible support of a vibrating load and includes resilient members of varying size or density; and Figs. 9 and 10 illustrate forms of flexible joints which are modified by shaping the resilient members to suit particular conditions of use.

Referring to the drawings, numeral 10 designates a vehicle spring which is mounted on the top half 11 of a housing by means of shackles 12, while the lower half 13 of the housing is fastened to 11 by means of bolts 14 or other suitable fastening means. The housing formed by portions 11 and 13 is open at the sides as shown, or is provided with suitable openings for the passage of the vehicle axle 15. This axle is floated between resilient cushions 16 and 17, formed preferably of live rubber in such shapes as may be required to meet particular conditions of operation. For example, as illustrated in Figs. 1 and 3, the axle 15 is provided with diagonally placed extensions 18 and 19, which are formed so that when the rubber blocks 16 and 17 are shaped to conform to the space between the axle and housing 11—13 cushions 20 and 21 extend along the vertical sides of the axle 15 above extension 18 and below extension 19, respectively.

In this way the vehicle axle 15 is enveloped by a rubber cushion, and the thicker portions of this cushion are placed where the greatest turning tendency of the axle takes place. In the example illustrated by Figure 1, the turning tendency of axle 15 when in operation on a vehicle is in a clock-wise direction, so that extension 19 presses downwardly upon cushion 21, while extension 18 presses upwardly on cushion 20, but since the forces at either side of the axle differ, the cushions are accordingly made of different size and resiliency as shown particularly in Figs. 9 and 10. In the case illustrated above, the constant diagonal position of the vehicle king pin is insured.

As illustrated in Figure 1, rubber blocks 16 and 17 may be divided into other operative cushions to procure greater resiliency by providing vertical grooves 22 and 23 in the upper and lower surfaces respectively of resilient blocks 17 and 16. Consequently, as axle 15 tends to turn either to the right or left, the two resilient cushions formed in blocks 16 and 17 by each of grooves 22 and 23 have a lateral freedom of movement by the flowing of the rubber into these grooves. The transverse section of the flexible joint as illustrated in Fig. 2 is preferably shaped so that a large cushion is placed on the top and bottom of the axle about its vertical axis, while the side cushions of blocks 16 and 17 are of less thickness. Accordingly, the swaying of the vehicle about the vertical axis is absorbed by the side cushions, which being relatively thin do not have the resiliency of the center cushions which are of greater thickness and principally absorb the vertical loads. The configuration of the axle at this point is well illustrated in Fig. 3, the upper transverse extension 19 being supplemented by similar large extensions 19' on either side thereof, while lower transverse extension 18 is provided with the same extension 18' at the sides thereof.

Modifications of the structure illustrated by Figs. 1, 2 and 3 are shown in Figs. 4, 9 and 10 in which the resilient blocks and the axle at these blocks are variously shaped to meet different operating conditions. For example, in Fig. 4, the resilient material of the blocks is equally divided about the horizontal axis of the axle. This form of joint is particularly adapted for absorbing shocks transmitted uniformly by the axle, as when a turning effect of the axle is equal in both directions, that is, both to the right and to the left. Similarly, Fig. 9 shows the resilient block and axle arrangement in which a greater cushioning is placed to the right of the axle as well as above right axle extension 19. This form is accordingly particularly adapted to loads producing a counter-clockwise rotation tendency of axle 15, and in which a considerable torque is procured in the direction of rotation. Fig. 10 is a modified form of the particular arrangement of Fig. 9 and in which the right axle extension is given a slight tilt while a secondary cushion 20' is added to block 16.

It will be noted that the modifications illustrated in Figs. 4, 9 and 10 are arranged so that the axle 15 is eccentrically placed with respect to the vertical center line of the housing 11—13 along which center line the housing is preferably mounted to the second element such as the spring illustrated in Fig. 1. It will be seen, therefore, that displacement of the axle from the mounting center procures a more resilient cushion effect since the shocks are taken up transversely as well as vertically. The use of this construction may be illustrated in connection with the front axle of an automobile or other vehicle in which a tilt is imparted to the axle through the king-pin or other connection, causing the front wheels to toe in slightly. This angle being in the direction of motion of the vehicle, causes this axle connection to receive numerous jolts and vibrations directly, while a torque is applied to the axle. Accordingly, the eccentric arrangement of the axle and the mounting as illustrated in Figs. 4, 9 or 10 takes up these shocks before they reach the spring.

According to the conditions of usage various changes may be made in the materials of construction. For example, the resilient members or blocks 16 and 17 shown in Figs. 1, 4, 9 and 10 may be made of the same or of different materials, or one block may be made of different material than the other. Portions of the blocks may be made of materials having various degrees of resiliency such as harder or softer rubber, and the like.

Referring to Figs. 5 to 8 inclusive, a second general form of flexible joint is illustrated. In Fig. 5, numeral 24 designates a shaft which is journaled through a suitable member such as a roller or ball-bearing 25 in member 26. Member 26 is provided with oppositely disposed cup-shaped arms 27 and 28, each of which embraces a spherical resilient member 29 and 30, respectively; these resilient members being preferably of different sizes. These resilient members, as well as member 26, are contained in a housing 31, the top of which is engaged by balls 30 and 29' while the bottom of the housing 31 is engaged by balls 29 and 30'. As shown in Fig. 5, the arrangement of arms 27 and 28 and their corresponding balls 29 and 30, respectively, provides for the rotation of shaft 24 in a counter-clockwise direction, the torque transmitted from shaft 24 to members 27 and 28 being also in the same direction. Accordingly, such vibrations as are transmitted from the machine or vibrating mechanism which is mounted on shaft 24 are transmitted through arms 27 and 28 to resilient members or balls 29 and 30, respectively, and in the direction of rotation of the shaft 24. One or more of the devices illustrated in Fig. 5 are adapted to be mounted on a shaft, for example, for the purpose of absorbing vibrations which would otherwise be transmitted from the machine to the foundation or other support. In this way, machines of various kinds may be made virtually noiseless and vibrationless without employing complicated shock absorbers or other vibration dampening mechanisms.

As illustrated in Fig. 6, balls 29 and 30 may be replaced by the corrugated cylindrical member 32 which is more completely illustrated in Fig. 7. This cylindrical element or rod 32 is preferably made of live rubber and contains an axial opening 33. This opening in the cylinders or rods 32 adds resiliency thereto since the live rubber is allowed to flow more freely under the load into this central opening 33, while the corrugations or grooves on the surface of the cylinders or rods hold them in place.

In Fig. 8, is shown a modified form of flexible joint for supporting a vibrating body. In this modification the body is supported or suspended from yoke 34 by means of a shaft, axle or the like 35. The ends of yoke 34 are provided with arms 36 and 37 which rest upon resilient balls or rods 38 and 39, respectively, these balls or rods being preferably of different diameters. In this way the load on axle or shaft 35 is supported resiliently upon balls or rods 38 so that whatever vibration is imparted to yoke 34 through axle or shaft 35 from a machine is absorbed by resilient rods or balls 38 and 39 before it is transmitted to the housing 40. Obviously, balls or rods 38 and 39 may be made of the same size or may be made of materials of a different density or the same material of different densities. As an example of this, rod or ball 38 may be made of relatively hard rubber while rod or ball 39 may be made of relatively soft rubber. This also applies to balls 29 and 30 and rods 32 shown in Figs. 5 and 6, respectively. If desired, these balls and rods may be made hollow to increase their resiliency and may be inflated with air or contain other materials which will increase their resiliency. Furthermore, if balls are used more than one of them may be employed on each side of the shaft, i. e., the machine is supported on a row of balls on each side of the shaft and these balls may be made of various degrees of resiliency such as alternating hard and soft rubber balls. While the devices shown in Figs. 5 to 8 inclusive employ only one shaft or axle, it is clear that more than one may be employed for the same set of resilient members or that one set of resilient members may be employed for each axle or shaft.

In each of the modifications described, the rubber cushions partially collapse and thus absorb shocks from an axle shaft or other vibrating member before the shocks are transmitted to the body upon which they are mounted. In short, the arrangements particularly shown in Figs. 1, 4, 9 and 10 may supplement vehicle or other springs without employing large, expensive and unsightly shock absorbers or other vibration dampening means. The flexible joints of this invention may be built directly into the apparatus as they are compact and employ no moving parts.

Furthermore, the modifications shown in Figs. 5 to 8 inclusive, may be employed to support vibrating loads so that instead of absorbing vibrations transmitted inwardly, i. e., as from the road to a moving vehicle, they absorb vibrations transmitted outwardly such as the vibrations from a piece of machinery to its foundation or other support. It will be seen, therefore, that the present invention provides for a most efficient and simple means for absorbing vibrations of all kinds and particularly those vibrations which accompanying moving bodies such as vehicles or stationary machines, vehicle seats and the like. While specific instances of usage have been illustrated in the specification and drawings, it is to be understood that such modifications may be made to meet different conditions of usage without departing in any way from the invention as defined by the appended claims.

I claim:

1. A flexible joint comprising an elongated member, a support for the member, a plurality of resilient bodies disposed between the member and the support, said bodies having a greater degree of resiliency at one side of the member than at the opposite side thereof and permitting a limited relative movement between the member and the support.

2. A flexible joint comprising an elongated member, a support for the member, and a pair of substantially L-shaped resilient bodies disposed between the member and the support and embracing the member.

3. A flexible joint comprising a shaft, lateral extensions on opposite sides of the shaft, a support for the shaft, resilient bodies between the extensions and the support, and resilient bodies between the shaft and the support, the bodies at the extensions having a different degree of resiliency than the bodies at the shaft.

4. A flexible joint comprising a shaft, a lateral extension on opposite sides of the shaft, a support for the shaft, and resilient bodies between the extensions and the support on each side of the shaft, the bodies at one extension having a different degree of resiliency than the bodies at the opposite extension.

5. A flexible joint comprising a shaft, a mounting arranged eccentrically with respect to the shaft, a mass of resilient material adjoining the shaft and the mounting, the material at the eccentric side of the shaft having a greater degree of resiliency than the remainder of the mass.

6. A flexible joint comprising a shaft, lateral extensions on opposite sides of the shaft, the extension on one side being longer than that on the other side of the shaft, a mounting for the shaft, and resilient bodies between the extensions and the mounting, said bodies having different degrees of resiliency.

7. A flexible joint comprising a shaft, lateral extensions on opposite sides of the shaft, the extension on one side being longer than that on the other side of the shaft, an eccentric mounting for the shaft adjacent the longer extension, and resilient bodies between the extensions and the mounting, the bodies at one extension having a different degree of resiliency than the bodies at the other extension.

In testimony whereof I affix my signature.

GERHARD FLINTERMANN.